(12) United States Patent
Thompson et al.

(10) Patent No.: US 9,996,228 B2
(45) Date of Patent: Jun. 12, 2018

(54) SMOOTH TRANSITION OF VIDEO PLAYBACK WITH PAGE FLIP ANIMATION

(71) Applicant: Flipboard, Inc., Palo Alto, CA (US)

(72) Inventors: Samuel Thompson, Houston, TX (US); Mark Rietveld, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 232 days.

(21) Appl. No.: 15/011,295

(22) Filed: Jan. 29, 2016

(65) Prior Publication Data
US 2017/0220216 A1 Aug. 3, 2017

(51) Int. Cl.
| | |
|---|---|
| *G06F 3/00* | (2006.01) |
| *G06F 3/0483* | (2013.01) |
| *G06T 13/80* | (2011.01) |
| *G11B 27/036* | (2006.01) |
| *H04N 5/265* | (2006.01) |
| *H04N 21/431* | (2011.01) |
| *H04N 21/472* | (2011.01) |

(52) U.S. Cl.
CPC ............ *G06F 3/0483* (2013.01); *G06T 13/80* (2013.01); *G11B 27/036* (2013.01); *H04N 5/265* (2013.01); *H04N 21/4312* (2013.01); *H04N 21/47202* (2013.01)

(58) Field of Classification Search
CPC ............ G06F 3/0483; G06F 17/30781; H04N 21/47202; H04N 21/4312; H04N 5/265; G06T 13/80; G06K 9/00711
See application file for complete search history.

(56) References Cited

U.S. PATENT DOCUMENTS

| | | | |
|---|---|---|---|
| 8,682,750 B2* | 3/2014 | Mirashrafi | G06Q 30/00 345/619 |
| 8,935,629 B2* | 1/2015 | Ying | G06F 3/0483 715/783 |
| 2008/0120670 A1* | 5/2008 | Easton | H04N 7/173 725/115 |

* cited by examiner

*Primary Examiner* — Jeffrey A Gaffin
*Assistant Examiner* — Ayesha Huertas Torres
(74) *Attorney, Agent, or Firm* — Fenwick & West LLP

(57) ABSTRACT

A computer implemented method enables smooth transition of video playback with page flip action within a digital magazine. The method comprises steps of monitoring a user's interactions with a video content item displayed on a current page of the digital magazine. Upon detecting a user flipping the current page to a next page, the video content item is paused, a graphics resource used for rending the video content item is disabled and a current video frame of the video content item is captured. In response to the user flipping the current page to the next page, the graphics resource is enabled for rending the page flip action, a modified current page with portions of the next page are gradually displayed to the user, while the captured video frame is continuously displayed on the current page until the page flip action is finished.

20 Claims, 5 Drawing Sheets

SMOOTH TRANSITION OF VIDEO PLAYBACK WITH PAGE FLIP ANIMATION

BACKGROUND

This disclosure relates generally to providing digital content to users of an online system, and more specifically to smooth transition of video playback with page flip action within a digital magazine.

Digital distribution channels disseminate a wide variety of digital content including videos, text, images, audio, links, and interactive media (e.g., games, collaborative content) to users. A user of a digital magazine mobile application can play videos on content pages of a digital magazine, where the digital magazine mobile application generates a page flip animation when the user turns each content page. However, playing back a video on a content page and turning the content page simultaneously in a digital magazine executed on a user device (e.g., a smartphone) require the use of some common hardware resources on the user device, for example, a graphics resource like a graphics processing unit (GPU), by calling Open Graphics Library (OpenGL) interface. The OpenGL is a cross-platform application programming interface (API) for rendering two-dimensional (2D) and three-dimensional (3D) graphics such as showing a video frame of a video. The OpenGL also enables the user device to render the page flip animation in a digital magazine. However, the graphics resource on some user devices cannot support both operations of rendering video playing back and page flip animation as described above at the same time due to the constraints of the graphics resource. For example, when a user intends to flip a page of a digital magazine with a video being played back on that page, the video content may turn to be invisible (e.g., completely black) upon the page flip action from the user, which degrades the user experience with the digital magazine.

SUMMARY

Embodiments of the invention enable smooth transition of video playback with page flip animation within a digital magazine on a client device. Embodiments of a disclosed method comprise monitoring a user's interactions with a video content item being displayed on a current page of the digital magazine. The graphics resource of the client device is used for rendering the video content item on the current page. Upon a detection of a page flip animation from the user to flip the current page to a next page of the digital magazine, the playing video content item is paused and a current video frame of the video content item on the current page is captured. The usage of the graphics resource for rendering the video content item is also disabled at the time when the page flip animation is detected. In response to the user flipping the current page to the next page, a modified current page with a portion of the next page is displayed within the digital magazine to the user, and the captured video frame is continuously displayed on the current page, replacing the original video content item until the page flip animation is finished. The graphics resource of the client device is enabled for rendering the page flip animation. After the page flip animation is finished, the complete next page is generated for display to the user.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION OF THE FIGURES

Example Digital Magazine System Environment

One embodiment of a disclosed configuration is a system (or a computer implemented method or a non-transitory computer readable medium) for rendering video content on a current page of a digital magazine to a user while the user is flipping the current page to a next page of the digital magazine.

A "digital magazine" herein refers to an aggregation of digital content items that can be presented to users in a presentable format similar to the format used by print magazines. A "content item" herein refers to any machine-readable and machine-storable work product, such as textual articles, pictures/images, videos, user-generated content (e.g., content posted on a social networking system), advertisements, and any other types of digital content capable of display within the context of a digital magazine. In one embodiment, a digital magazine assembles a list of universal resource locators (URLs), where each video, image or textual article of the digital magazine is based on the content of a resource on the Internet to which a URL of the list of the URLs references to. A page flip animation refers to an operation of generating a next page of a digital magazine in response to a user flipping a current page of the digital magazine. A current page of a digital magazine refers to a page of the digital magazine, with which a user of the digital magazine is currently interacting, e.g., viewing the video content displayed on the page; a next page is a page of the digital magazine, which is generated in response to a user action on a current page, e.g., flipping the current page.

Figure 1:
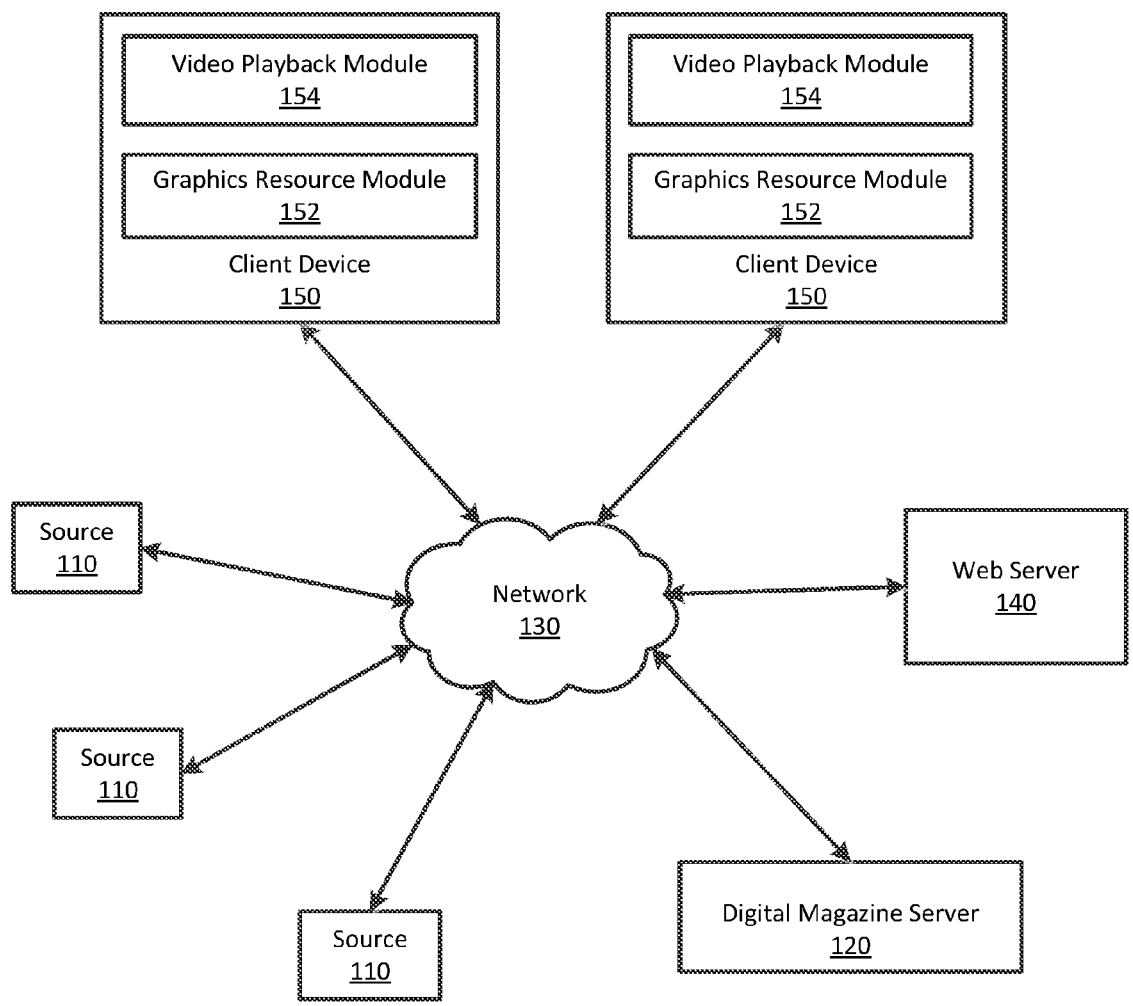
FIG. 1 is a block diagram of a system environment for smooth transition of video playback on a page of a digital magazine with page flip animation in the digital magazine, according to one embodiment.

FIG. 1 is a block diagram of a system environment 100 for smooth transition of video playback on a page with page flip animation in a digital magazine, according to one embodiment. The system environment 100 shown in FIG. 1 includes one or more sources 110, a digital magazine server 120, a web server 140, one or more client devices 150 and a network 130. Only three sources 110, one digital magazine server 120, one web server 140 and two client devices 150 are shown in FIG. 1 in order to simplify the description. Embodiments of the system environment 100 can have multiple sources 110, digital magazine servers 120, web servers 140 and client devices 150 connected through the network 130. Likewise, the functions performed by the various entities of FIG. 1 may differ in different embodiments. The embodiments described herein can be adapted to online systems that are not digital magazine servers 120.

A source 110 is a computing system capable of providing various types of digital content to a client device 150 and to a digital magazine server 120. Examples of content provided by a source 110 include text, images, video, or audio on web pages, web feeds, social networking information, messages or other suitable digital data. Additional examples of content include user-generated content such as blogs, tweets, shared images, audios or videos, social networking posts and social networking status updates. Content provided by a source 110 may be received from a publisher and distributed by the source 110; alternatively, a source 110 may be the publisher that generates content. For convenience, content from a source 110, regardless of its composition, is referred to herein as a "content item". A content item may include various types of content elements such as text, image, audio, video, interactive media, links and a combination thereof.

The digital magazine server 120 is a computer system that receives content items from one or more sources 110 or provided by users of the digital magazine server 120, generates pages in a digital magazine by processing the received content, and provides the pages to the client device 150 or provides instructions to the client device 150 to generate pages in a digital magazine. In one embodiment, the digital magazine server 120 instructs a digital magazine application executed on the client device 150 to play, pause or stop a video content item displayed on a page of the digital magazine. In response to a detection of the user turning the current page containing the video content item to a next page, the digital magazine server 120 instructs the digital magazine application to pause the playing of the video content item and to capture a current video frame of the video content item being played. The digital magazine server 120 further instructs the client device 150 to render the page flip animation in response to the user action while continuing displaying the current video frame of the video content item during the page flip animation rendering so as to provide an enhanced user experience with the digital magazine.

The one or more sources 110, the digital magazine server 120, the web server 140 and the one or more client devices 150 communicate with each other via the network 130. The network 130 may comprise any combination of local area and/or wide area networks, using both wired and/or wireless communication systems. In one embodiment, the network 120 uses standard communications technologies and/or protocols. For example, the network 130 includes communication links using technologies such as Ethernet, 802.1, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

The web server 140 is a computer system that processes requests based on network protocols, e.g., HTTP. In one embodiment, the web server 140 links the digital magazine server 120 via the network 130 to the one or more client devices 150, as well as to the one or more sources 110. The web server 140 serves web pages as well as other digital content to the digital magazine server 120 and communicates instructions to a client device 150 for generating pages of content items in a suitable presentation style/format for presentation to a user of the client device 150. In the embodiment shown in FIG. 1, the web server 140 is a network entity separate from the digital magazine server 120. In other embodiments, the web server 140 is a component of the digital magazine server 120.

The client device 150 is a computing device capable of receiving user input as well as transmitting and/or receiving digital data from the source 110 or the digital magazine server 120 via the network 130. Various embodiments of the client device 150 include a conventional computer system, such as a desktop or a laptop computer, and a device having computer functionality, such as a personal digital assistant (PDA), a mobile telephone, a smartphone or another suitable device. In one embodiment, the client device 150 executes an application allowing a user of the client device 150 to interact with the digital magazine server 120. For example, an application executing on the client device 150 communicates instructions or requests for content items to the digital magazine server 120. The client device 150 also executes a browser that receives pages from the digital magazine server 120 and presents the pages to a user accessing the client device 150. In another embodiment, the client device 150 interacts with the digital magazine server 120 through an API running on a native operating system of the client device 150, such as IOS® or ANDROID™.

Different client devices 150 may have different characteristics such as different processing capabilities, different connection speeds with the digital magazine server 120 over the network 130, and different device types (e.g., make, manufacture, and version). For example, in one embodiment, a client device 150 includes a display device (not shown) and an input device (not shown). A display device included in the client device 150 presents content items to a user of the client device 150. An input device included in the client device 150 receives input from a user of the client device 150. The user input is processed by a digital magazine application executing on the client device 150 to allow the user to interact with content items presented by the digital magazine server 120.

In the embodiment of FIG. 1, the client device 150 includes a graphics resource module 152 and a video playback module 154. Other embodiments of the client device 150 may include different or additional modules other than those shown in FIG. 1. The graphics resource module 152 monitors graphics resources of the client device 150. For example, the graphics module 152 monitors the usage of a graphics resource of the client device 150, such as computer instructions for calling an API to render 2D or 3D graphics (e.g., video frames and page flip animation) for the client device 150. Example graphics resource monitored by the graphics resource module 152 includes a graphics processing unit (GPU) of the client device 150. The client device 150 calls the OpenGL or any other existing graphics rendering schemes known to those of ordinary skill in the art to interact with the GPU of the client device 150 to perform hardware-accelerated graphics rendering. The graphics resource like the GPU of the client device 150 accessed through OpenGL API calls may not be used for rendering the animation of flipping a page of the digital magazine while playing video content at the same time due to the hardware constraints of the graphics resource. In response to a detection of multiple calls to the OpenGL API, the graphics resource module 152 communicates with the video playback module 154 for smoothly transiting the presentation of a video content item being played in a digital magazine page to the presentation of a next digital magazine page during the process of rendering page flip animation. In one embodiment, the graphics resource module 152 disables the usage of the graphics resource for rendering the video content on a page of a digital magazine in response to a page flip user action, and enables the usage of the graphics resource for rendering the page flip animation.

The video playback module 154 of the client device 150 provides smooth transition from presenting video content items that are displayed on a current page of a digital magazine to present a next page of the digital magazine during the rendering of page flip animation. In one embodiment, as more fully described below with reference to FIG. 3, the video playback module 154 executes a digital magazine application to generate the smooth transition in response to a page flip user action.

Example Presenting Pages of a Digital Magazine

Figure 2B:
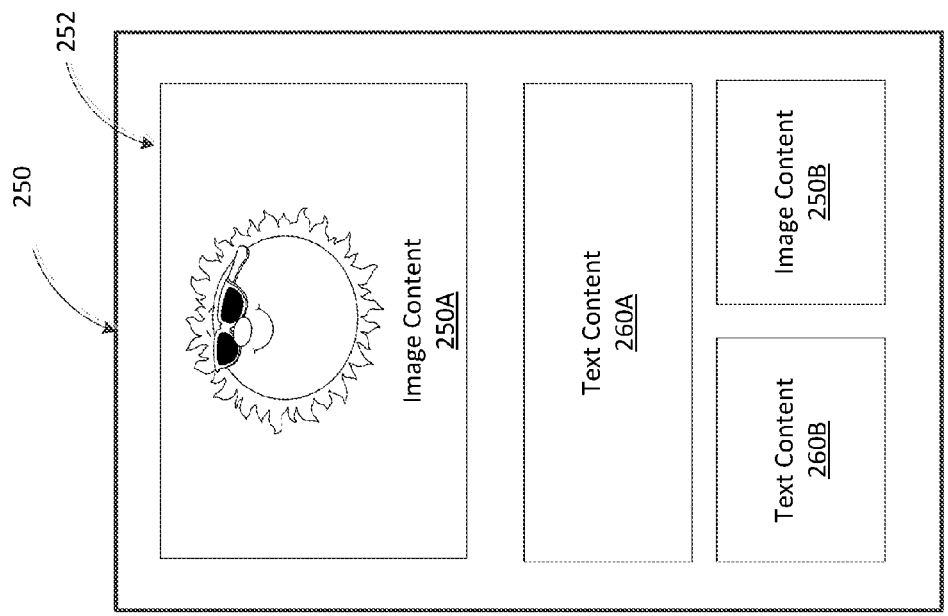
FIG. 2B is an example digital magazine page rendered in response to a user turning the digital magazine page shown in FIG. 2A to the digital magazine page shown in FIG. 2B, according to one embodiment.
Figure 2A:
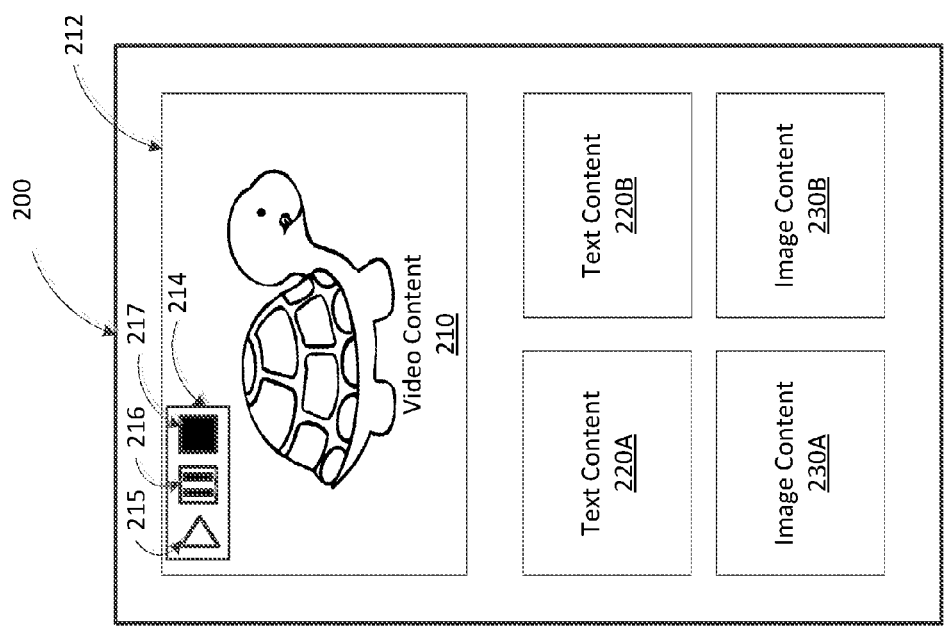
FIG. 2A is an example digital magazine page with video content presented on a client device, according to one embodiment.

FIG. 2A is an example digital magazine page 200 with video content presented on a display of a client device 150, according to one embodiment. In the embodiment of FIG. 2A, the digital magazine page 200 includes one or more content slots for presenting different content items on the page 200 to a user according to a page layout template. A page template includes one or more content slots, and each slot presents one or more content items. For example, a content slot in a page layout template is used to present a video while another slot in the page layout template is used to present an image. Each content slot has a size (e.g., small, medium, or large) and an aspect ratio. For example, the content slot 210 is for presenting a video content item 212, the content slots 220A and 220B are for presenting text content items such as textual articles, blogs or user-generated posts, and the content slots 230A and 230B are for presenting image content items such as static pictures and user-uploaded photos. In alternative embodiments, additional or fewer content slots for presenting content items in different formats such as videos, audio, texts or images can be shown on the digital magazine page 200. In one embodiment, the content slot 210 for presenting a video content item further includes an interface bar 214, which allows a user to interact with the video content item 212 displayed in the content slot 210. The interface bar 214 includes a play button 215, a pause button 216 and a stop button 217. The play button 215 is configured for users to play the video content item 212 from beginning or from a pause state. The pause button 216 is configured for users to pause the playing of the video content item 212. The stop button 217 is configured for users to stop the playing of the video content item. In alternative embodiments, the content slot 210 for presenting the video content item 212 may be used for presenting additional or fewer interaction tools for users to interact with the video content item 212. As shown in FIG. 2A, the video content item 212 presented in the content slot 210 is represented by a current video frame of the video content item 212, i.e., a turtle picture, associated with the playing back of the video content item 212.

FIG. 2B is an example digital magazine page 250 rendered in response to a user turning the digital magazine page 200 shown in FIG. 2A to the digital magazine page 250, according to one embodiment. In the embodiment of FIG. 2B, the digital magazine page 250 is a next page of the digital magazine to be presented to the user of the digital magazine after a page flip user action on the digital page 200 shown in FIG. 2A. In the embodiment shown in FIG. 2B, the digital page 250 includes one or more content slots for presenting content items on the page 250 to a user, where the content items presented in the page 250 can be different from the content items presented in the page 200 shown in FIG. 2A such as without video content items. The content slots 250A and 250B are for presenting to image content items, and the content slots 260A and 260B are for presenting text content items. As shown in FIG. 2B, the image content item 252 presented in the content slot 250A is a static image of a cartoon sun picture. In one embodiment, the digital magazine page 250 is generated by the video playback module 154 of the client device 150. In response to the detection of a user of the client device 150 turning the digital magazine page 200 shown in FIG. 2A, the video playback module 154 generates the digital magazine page 250 in such a way that the transition from the presentation of the digital magazine page 200 to the presentation of the digital content page 250 shown in FIG. 2B is smooth, e.g., without blacking out the video frame showing the turtle of the video content item 212 during the transition.

For the content items presented in the content slots on a digital magazine page such as the page 200 shown in FIG. 2A and the page 250 shown in FIG. 2B, video content items may have file formats such as MP4, WMV, MOV, AVI and other suitable video file formats. Image content items may have file formats such as JPEG, PNG, BMP and other suitable image file format.

Example Video Playback Module

Figure 3:
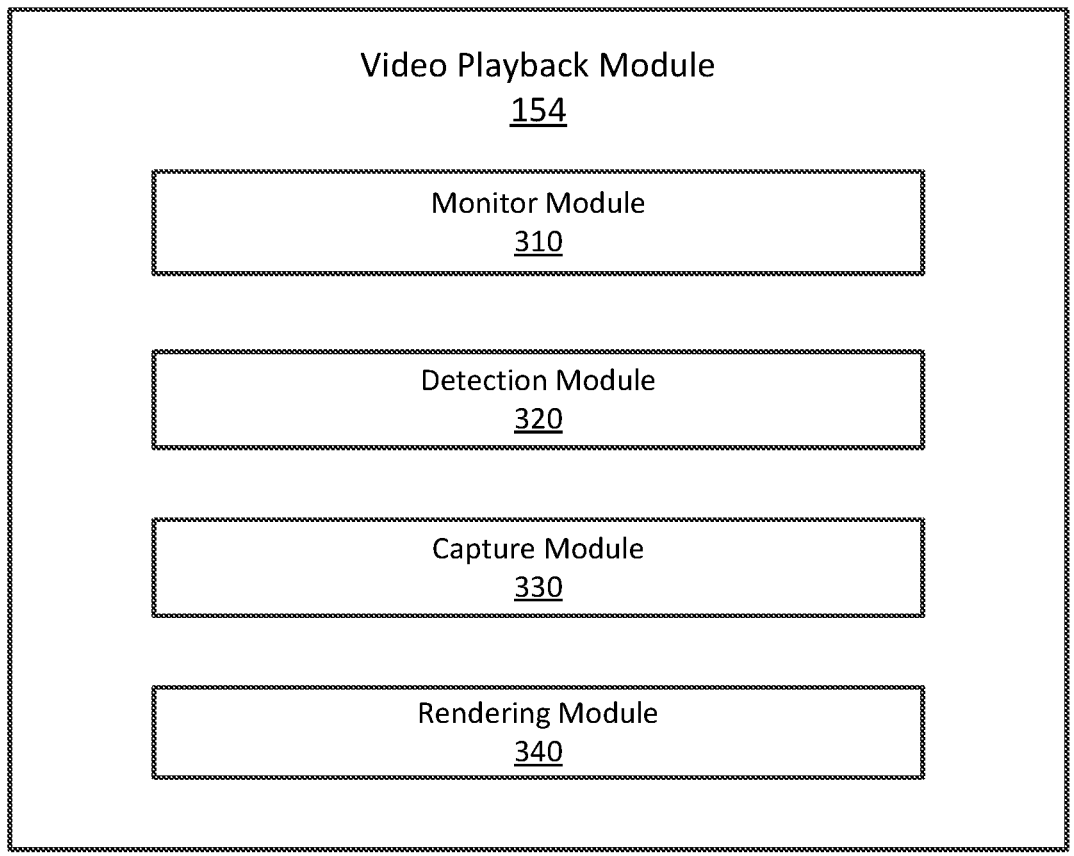
FIG. 3 is an example block diagram of a video playback module, according to one embodiment.

FIG. 3 is an example block diagram of a video playback module 154 that provides smooth transition from presenting a current page having a video content item being played back to presenting a next page of a digital magazine in response to a user turning the current page, according to one embodiment. In the embodiment of FIG. 3, the video playback module 154 includes a monitor module 310, a detection module 320, a capture module 330 and a rendering module 340. In alternative embodiments, additional or fewer components can be shown in the video playback module 154.

The monitor module 310 monitors the video content items displayed on a page of a digital magazine on a client device 150. In one embodiment, the monitor module 310 receives the video content items generated by the digital magazine server 120 and presents a page having the received video content items to a user of the client device 150. The monitor module 310 plays the video content items according to user interactions with the video content items. For example, the monitor module 310 launches a media player to play back a video content item on the page responding to a play request, e.g., when a user presses a play button 215 shown in FIG. 2A. The monitor module 310 instructs the rendering module 340 to generate a display of video frames of a video content item in response to the video content item being played in the page. In one embodiment, the monitor module 310 automatically pauses the media player of the video in response to a notification from the detection module 320 of a detection of a page flip user action on the page having the video content item being played.

The detection module 320 detects a page flip action from a user. The page flip action indicates that a user of the client device 150 is trying to flip a current page of a digital magazine to a next page of the digital magazine. A user of a digital magazine may flip, drag, or resize a page of the digital magazine to change the display region of the page. The detection module 320 determines a page flip operation based on user interaction with the client device 104. For example, if a release operation is detected and a change in the coordinate of an area of the page to be released occurred within the predetermined time period (e.g., 2 seconds) before the end of the release operation, the detection module 320 determines the input operation is a page flip operation.

The detection module 320 may further determine a direction and a velocity of the page flip operation. For example, a page flip can be a vertical flip, e.g., from the bottom towards the top of the page or from the top towards the bottom of the page. The page flip can also be a horizontal flip, e.g., from the left towards the right of the page or from the right towards the left of the page. The direction of a page flip action may indicate how a user is to get a next page according to predefined page order rules. As one example, the page order rules define a forward flip as a flip, where a user receives a next page that he or she hasn't viewed previously after the flip animation is finished. The page order rules also define a backward flip as a flip, where the user receives a next page that was previously presented right before the flip animation after the flip animation is finished. An example forward flip includes a flip operation from the bottom to the top of the page and an example backward flip includes a flip operation from the top towards the bottom of the page. In alternative embodiments, the page order rules can be different.

The capture module 330 captures a video frame of a video content item that is being played on a current page of a digital magazine. The captured video frame is a static image with an image file format and a timestamp is stored in a store in the client device 150. In one embodiment, the capture module 330 captures a video frame of the video content item that is being played on the current page upon a page flip user action is detected by the detection module 320. Alternatively, the capture module 330 periodically captures and stores video frames of the video content item. The captured video frame stored in the store in the client device 150 may also be used for later display.

The rendering module 340 generates pages of a digital magazine for displaying to a user of the digital magazine according to page layout instructions received from the digital magazine server 120 or based on user input. For example, the rendering module 340 generates a current page 200 as shown in FIG. 2A before a page flip user action, where a video content item 212 is being played on the current page. The current page 200 as shown in 2A includes a captured video frame (i.e., the frame showing a turtle) associated with the current playing back of the video content item 212 and other content items such as text content (220A and 220B) and image content (230A and 230B). In one embodiment, when a user starts flipping a current page of the digital magazine and before the flip animation is finished, the rendering module 340 generates a modified current page, which shows the captured video frame corresponding to the video playback right before the page flip action and some portion of the next page of the digital magazine. In response to the finishing of the page flip user action, the rendering module 340 generates a next page of the digital magazine as shown in FIG. 2B.

In one embodiment, the rendering module 340 generates a modified current page in response to a page flip user action. In response to a video content item being played on the current page, the rendering module 340 displays the video frame of the video content item corresponding to the playing back of the video content item right before the page flip user action as a part of the modified current page. The modified current page also shows a portion of a next page in response to the page flip user action, where the video frame shown on the original current page and portions of the next page on the modified current page represents the smooth transition of the pages presented to the user of the digital magazine. Upon the finishing of the page flip user action, the modified current page becomes the next page, which replaces the original current page and indicates the end of the smooth transition.

As described above, a page flip action can be a forward flip or a backward flip. The rendering module 340 generates the next page according to the type of the page flip action. For example, if the page flip action is a forward flip such as flipping the current page 200 shown in FIG. 2A from the bottom towards the top of the current page 200, the rendering module 340 generates the next page (e.g., page 250), which contains content items the user hasn't viewed previously. On the other hand, if the page flip action is a backward flip such as flipping the current page 250 shown in FIG. 2B to the previous page 200 as shown in FIG. 2A, the rendering module 340 generates the next page (i.e., page 200), which contains content items the user has viewed previously.

Figure 4:
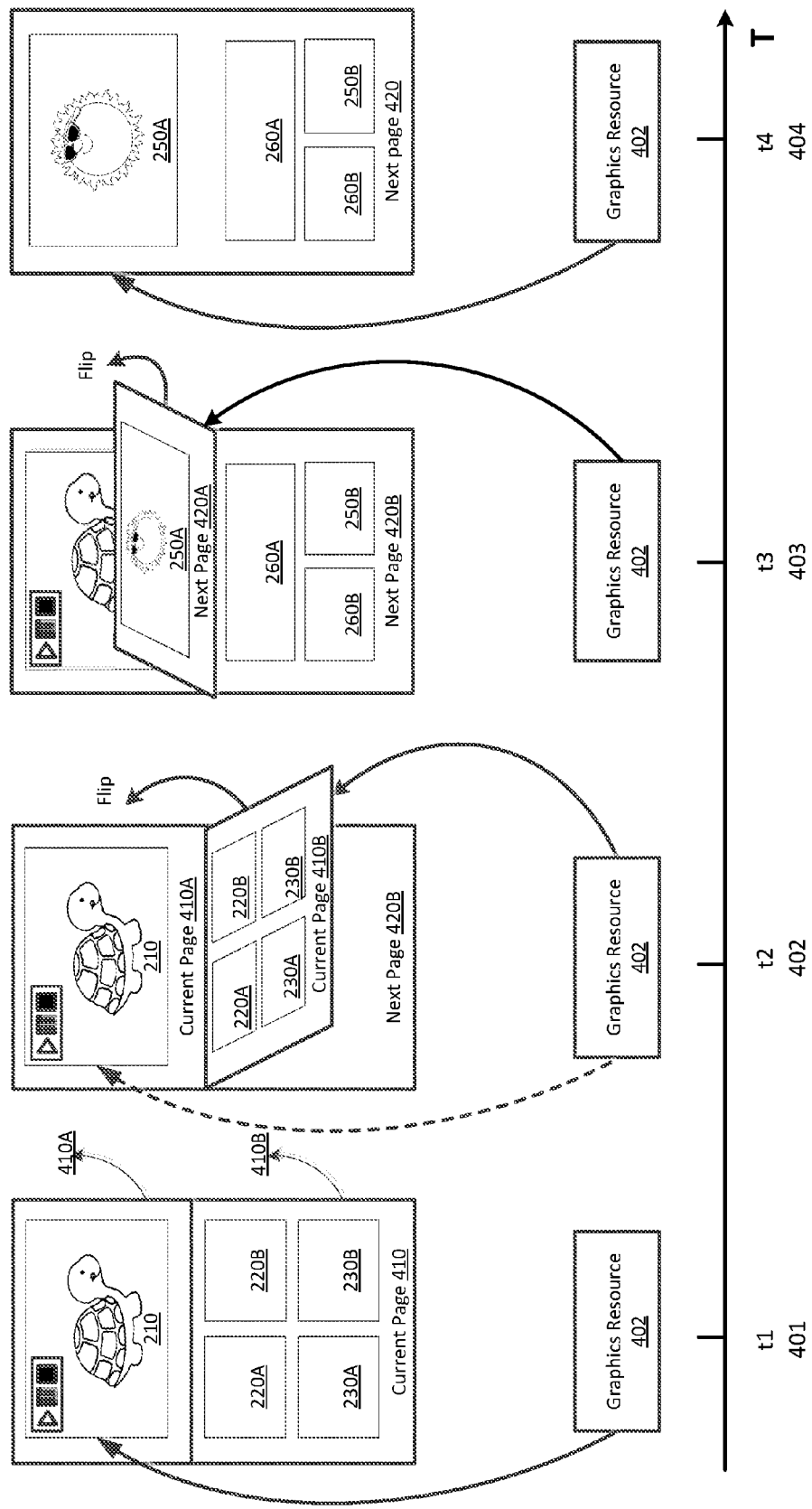
FIG. 4 shows pages of a digital magazine generated during a process of rendering a page flip animation, according to one embodiment.

FIG. 4 shows pages of a digital magazine generated by the rendering module 340 during the process of rendering a page flip animation, according to one embodiment. In the embodiment of FIG. 4, the page flip action is a forward flip, where the user flips the current page 410 from the bottom to the top of the current page 410; the page flip action is divided into to 4 stages represented by timestamps, Stage t1 401, Stage t2 402, Stage t3 403 and Stage t4 404, along a horizontal time axis T. For simplicity of description, the current page 410 is the page 200 described in FIG. 2A and the next page 420 is the page 250 described in FIG. 2B. The current page 410 has a video content item displayed in the content slot 210, text content items in the content slots 220A and 220B, and image content items in the content slots 230A and 230B. The next page 420 has image content items in the content slots 250A and 250B, and text content items in the content slots 260A and 260B. The graphics resource 402 of the client device 150 is also shown in FIG. 4 and solid line from the graphics resource 402 to the content items pointed to by the solid line on each page indicates the usage of the graphics resource 402 by the content item on the page for each transition stage.

Stage t1 401 shows the current page 410 presented on a display of the client device 150 before the user flips the current page 410. The current page 410 has two parts: part 410A for presenting the playing back of the video content item and part 410B for presenting the non-video content items (e.g., 220A/B and 230A/B). As shown in Stage t1 401, the graphics resource 402 of the client device 150 is currently used by the rendering module 340 to render the video frames of the video content item. In the example shown in FIG. 4, the part 410A shows the video content item is being played, where the video content item is represented by a video frame of a turtle image at t1 401. The capture module 320 of the video playback module 154 captures a video frame of the video content item currently being played upon the detection of a page flip user action at stage t1 401, and the monitoring module 310 pauses the play of the video content item. The monitoring module 310 further notifies the graphics resource module 152 of the client device 150 to disable the usage of the graphics resource 402 associated with the playing back of the video content item. The rendering module 340 displays the captured static video frame of the video content item after the page flip animation is started and before the page flip animation is finished.

Stage t2 402 shows a partially flipped current page 410 with a partial next page 420 of the digital magazine after the page flip animation starts. In the example of FIG. 4, the page flip direction is from the bottom towards the top of the current page 410 according to the page order rules as described above. The page flips around an axis that separates the current page 410 into two parts: an upper part 410A and a lower part 410B. The upper part 410A shows the static video frame captured at stage t1 401 in the content slot 210, and the lower part 410B shows the text content items in content slots 220A and 220B, and the image content items in the content slots 230A and 230B. Due to the page flip user action, the lower part 410B has been partially flipped away from its original position shown in the stage t1 401. A lower part 420B of the next page 420 is also shown in the stage t2 402, replacing a part of the lower part 410B of the current page 410. The rest part of the next page 420 is still hidden due to the partial page flip action. Stage 2 402 also shows the graphics resource monitored by the graphics resource module 152 is currently used by the rendering module 340 for implementing the page flip animation instead of being used for playing the video content item at Stage t1 401.

Stage t3 403 shows a further modified current page 410 with a complete lower part 420B of the next page 420 being displayed before the flip animation is finished. In the transition stage t3 403, a complete lower part 420B of the next page 420 and an upper part 420A of the next page are shown. The upper part 410A of the current page 410 is now partially hidden by the upper part 420A of the next page 420. As shown in Stage t3 403, the graphics resource monitored by the graphics resource module 152 is still used by the rendering module 430 for the page flip animation before the flip animation is finished.

Stage t4 404 shows a complete next page 420 generated by the rendering module 430 when the page flip animation is finished. When the page flip animation is finished, the page of the digital magazine shows the complete next page 420 that is different than the current page 410 previously viewed by the user. As shown in Stage t4 404, the graphics resource monitored by the graphics resource module 152 is currently used by the rendering module 340 for rendering the content items displayed on the next page 420, including graphics items like the 2D image shown in the content slot 250A.

In response to a backward flip user action such as flipping the page 420 back to the page 410, the rendering module 340 renders the pages as shown in FIG. 4 but in a reverse order, i.e., from Stage t4 404 to Stage t1 401. The graphics resource of the client device 150 monitored by the graphics resource module 152 and used by the rendering module 340 at Stage t4 404 is stopped at Stage t4 404; the graphics resource is subsequently used by the rendering module 340 for generating the content items, including graphics items, e.g., displaying the video frames of the video content item shown in page 410, in the subsequent transition stages.

Figure 5:
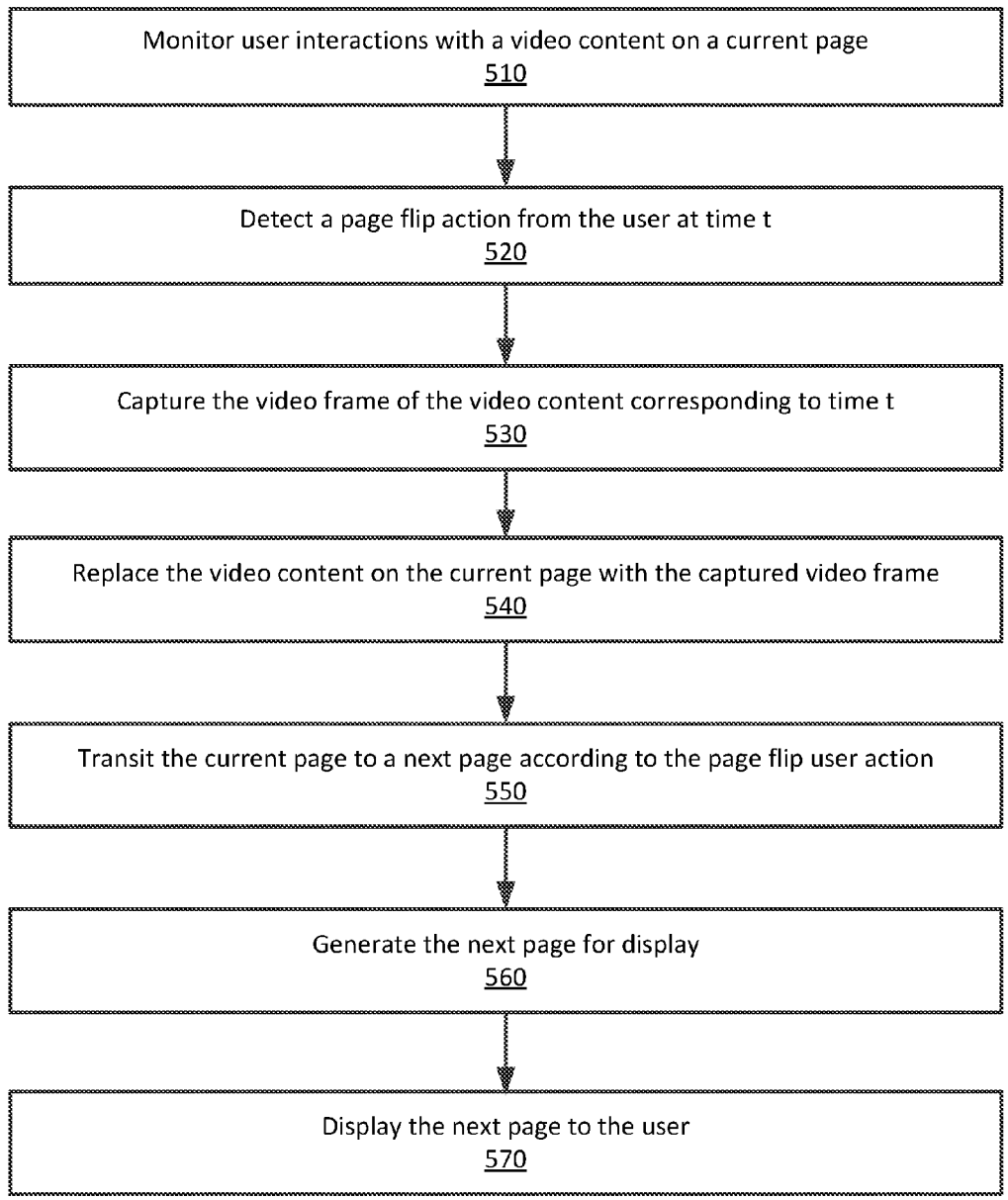
FIG. 5 is a flowchart illustrating a process of generating pages of a digital magazine during a page flip animation, according to one embodiment.

FIG. 5 is a flowchart illustrating a process of generating pages of a digital magazine during a page flip user action, according to one embodiment. Initially, the video playback module 154 monitors 510 user interactions with a video content item displayed on a current page of the digital magazine on a client device 150. Upon detecting 520 a page flip action from the user to flip the current page at time t, the video playback module 154 pauses the playing of the video content item and captures 530 a video frame of the video content item corresponding to the time t. The video playback module 154 replaces 540 the video content item displayed in a content slot on the current page with the captured video frame, and generates the current page with the captured video frame and other content items to the user. Responding to the user flipping the current page to the next page, the video playback module 154 transits 550 the current page to the next page according to the page flip action while continuously displaying the captured video frame on the current page until the page flip animation is finished. After the page flip animation is finished, the video playback module 154 generates 560 the next page for display. Depending on the type of the page flip action, e.g., a forward flip or a backward flip, the next page generated by the video playback module 154 may contain content items the user has or has not previously viewed. The video playback module 154 displays 570 the next page of the digital magazine to the user.

In one embodiment as described above not shown in FIG. 5, if the user flips back to the current page instead of flipping towards to the next page, the video playback module 154 displays the previous current page on the display of the client device 150 to the user after the page flip animation is finished. In this embodiment, after the page flip animation is finished, the video playback module 154 may automatically resume the playing of the video content item displayed on the current page from the paused point without any request to play the video content item from the user. As another example for the embodiment described above, the video playback module 154 may explicitly resume the playing of the video content item from the paused point after the play request is received from the user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method, comprising:
    monitoring a user's interactions with a video content item presented on a current page of a digital magazine on a client device, the video content item presented on the current page being rendered using a graphic resource of the client device;
    detecting, by the client device, a page flip action from the user on the current page;
    responsive to detecting the page flip action:
        pausing playing back of the video content item on the current page,
        releasing usage of the graphic resource of the client device, and
        capturing, by the client device, a video frame of the video content item corresponding to the time of the page flip action being detected;
    displaying a page flip animation on the client device by:
        replacing the video content on the current page with the captured video frame,
        generating a series of frames for the page flip animation by the client device, the frames comprising the current page having the captured video frame and at least a portion of a next page of the digital magazine, and
        displaying the series of frames of the page flip animation using the graphic resource of the client device; and
    displaying the next page on the client device after the page flip animation is displayed.

2. The method of claim 1, wherein detecting the page flip action from the user on the current page comprises:
    detecting the direction of the page flip action on the current page; and
    determining a type of the page flip action based on the detected direction of the page flip action.

3. The method of claim 2, wherein the type of a page flip is one of: a forward flip and a backward flip.

4. The method of claim 3, wherein for a forward flip, the next page has content items, which the user has not reviewed previously.

5. The method of claim 3, wherein for a backward flip, the next page is a page that was previously presented to the user right before the page flip action.

6. The method of claim 1, wherein releasing usage of the graphic resource of the client device comprises:
    reallocating the graphics resource of the client device in response to the detected page flip action.

7. The method of claim 6, wherein reallocating the graphics resource of the client device comprises:
    disabling the usage of the graphics resource associated with rendering video frames of the video content item on the current page.

8. The method of claim 6, wherein reallocating the graphics resource of the client device further comprises:
    enabling the usage of the graphics resource associated with rendering graphics items of the next page.

9. The method of claim 1, wherein the graphics resource of the client device is a graphics processing unit of the client device, and the graphics processing unit is configured to generate two-dimensional or three-dimensional graphics of the content items presented on the current age of the digital magazine.

10. The method of claim 1, wherein the portion of the next page being displayed on the series of frames is determined based on the progress of the page flip action, and wherein a larger portion of the next page is displayed on the series of frames in response to the page flip action is closer to be finished.

11. A non-transitory computer-readable storage medium storing computer program instructions, the computer program instructions when executed by a computer processor causes the processor to perform steps of:
    monitoring a user's interactions with a video content item presented on a current page of a digital magazine on a client device, the video content item presented on the current page being rendered using a graphic resource of the client device;
    detecting, by the client device, a page flip action from the user on the current page;
    responsive to detecting the page flip action:
        pausing playing back of the video content item on the current page;
        releasing usage of the graphic resource of the client device; and
    capturing, by the client device, a video frame of the video content item corresponding to the time of the page flip action being detected;
    displaying a page flip animation on the client device by:
        replacing the video content on the current page with the captured video frame,
        generating a series of frames for the page flip animation by the client device, the frames comprising the current page having the captured video frame and at least a portion of a next page of the digital magazine, and
        displaying the series of frames of the page flip animation using the graphic resource of the client device; and
    displaying the next page on the client device after the page flip animation is displayed.

12. The computer-readable storage medium of claim 11, wherein detecting the page flip action from the user on the current page comprises:
    detecting the direction of the page flip action on the current page; and
    determining a type of the page flip action based on the detected direction of the page flip action.

13. The computer-readable storage medium of claim 12, wherein the type of a page flip is one of: a forward flip and a backward flip.

14. The computer-readable storage medium of claim 13, wherein for a forward flip, the next page has content items, which the user has not reviewed previously.

15. The computer-readable storage medium of claim 13, wherein for a backward flip, the next page is a page that was previously presented to the user right before the page flip action.

16. The computer-readable storage medium of claim 11, wherein releasing the usage of the graphic resource of the client device comprises:
   reallocating the graphics resource of the client device in response to the detected page flip action.

17. The computer-readable storage medium of claim 16, wherein reallocating the graphics resource of the client device comprises:
   disabling the usage of the graphics resource associated with rendering video frames of the video content item on the current page.

18. The computer-readable storage medium of claim 16, wherein reallocating the graphics resource of the client device further comprises:
   enabling the usage of the graphics resource associated with rendering graphics items of the next page.

19. The computer-readable storage medium of claim 11, wherein the graphics resource of the client device is a graphics processing unit of the client device, and the graphics processing unit is configured to generate two-dimensional or three-dimensional graphics of the content items presented on the current age of the digital magazine.

20. The computer-readable storage medium of claim 11, wherein the portion of the next page being displayed on the series of frames is determined based on the progress of the page flip action, and wherein a larger portion of the next page is displayed on the series of frames in response to the page flip action is closer to be finished.

\* \* \* \* \*